United States Patent
Clarkin et al.

(10) Patent No.: US 6,752,537 B2
(45) Date of Patent: Jun. 22, 2004

(54) CONNECTOR FERRULE AND METHOD OF SEALING

(75) Inventors: James P Clarkin, Scottsdale, AZ (US); John Shannon, Scottsdale, AZ (US); Michael Swengler, Phoenix, AZ (US)

(73) Assignee: Polymicro Technologies, LLC, Phoenix, AZ (US)

( * ) Notice: Subject to any disclaimer, the term of this patent is extended or adjusted under 35 U.S.C. 154(b) by 0 days.

(21) Appl. No.: 10/201,624

(22) Filed: Jul. 24, 2002

(65) Prior Publication Data

US 2003/0095752 A1 May 22, 2003

(Under 37 CFR 1.47)

Related U.S. Application Data

(63) Continuation-in-part of application No. 09/910,863, filed on Jul. 24, 2001.
(60) Provisional application No. 60/267,710, filed on Feb. 12, 2001.

(51) Int. Cl.$^7$ .................................................. G02B 6/36
(52) U.S. Cl. ........................................................ 385/78
(58) Field of Search ............................... 385/76–78, 80, 385/139

(56) References Cited

U.S. PATENT DOCUMENTS

| | | | | |
|---|---|---|---|---|
| 5,061,034 A | * | 10/1991 | Fujikawa et al. | 385/95 |
| 5,745,626 A | * | 4/1998 | Duck et al. | 385/96 |
| 5,841,922 A | * | 11/1998 | Iwatsuka et al. | 385/76 |
| 2002/0110332 A1 | | 8/2002 | Clarkin et al. | 385/78 |

FOREIGN PATENT DOCUMENTS

| WO | WO 97/28477 | 8/1997 |
|---|---|---|
| WO | WO 03/010562 | 2/2003 |

* cited by examiner

*Primary Examiner*—Javaid H. Nasri
(74) *Attorney, Agent, or Firm*—Pillsbury Winthrop LLP

(57) ABSTRACT

The invention includes a ferrule having a layer of material on an inner surface of a hole therein which is selected to be preferentially softenable relative to the bulk material of the ferrule. The ferrule according to the present invention can be fused to optical fibers, capillaries and the like while reducing deformation of the fused component and the ferrule. A fiber Bragg grating device and a flow cell device are also provided.

11 Claims, 5 Drawing Sheets

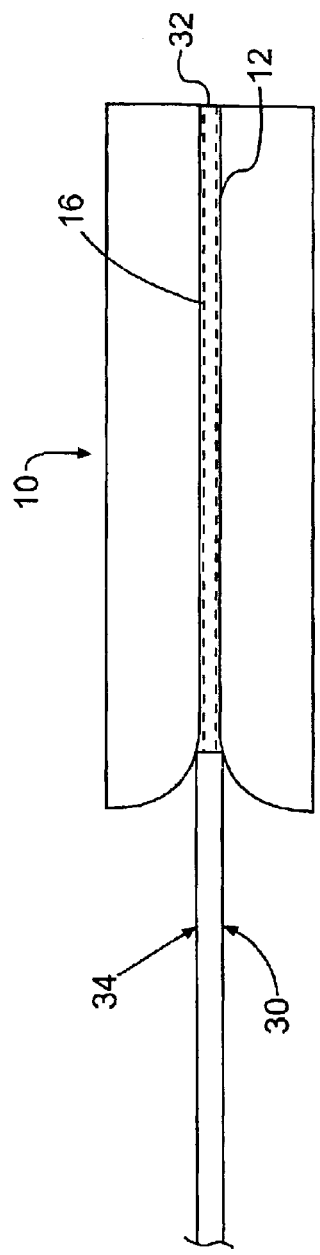
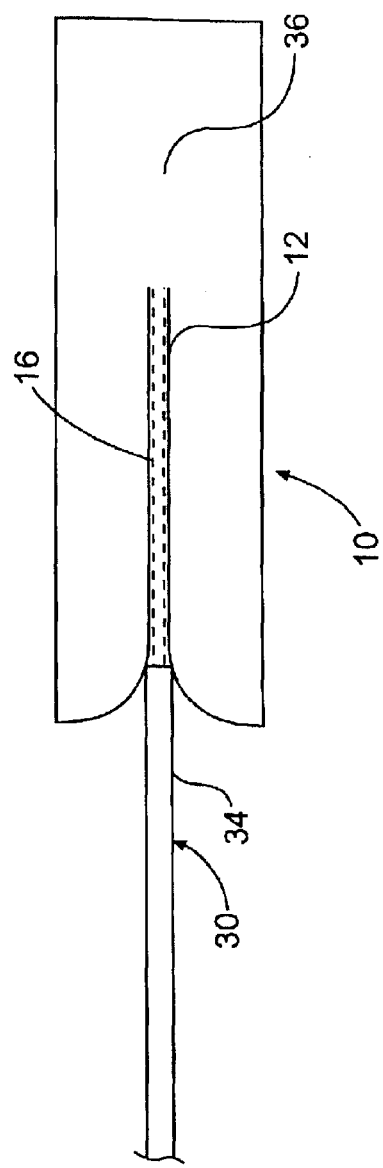

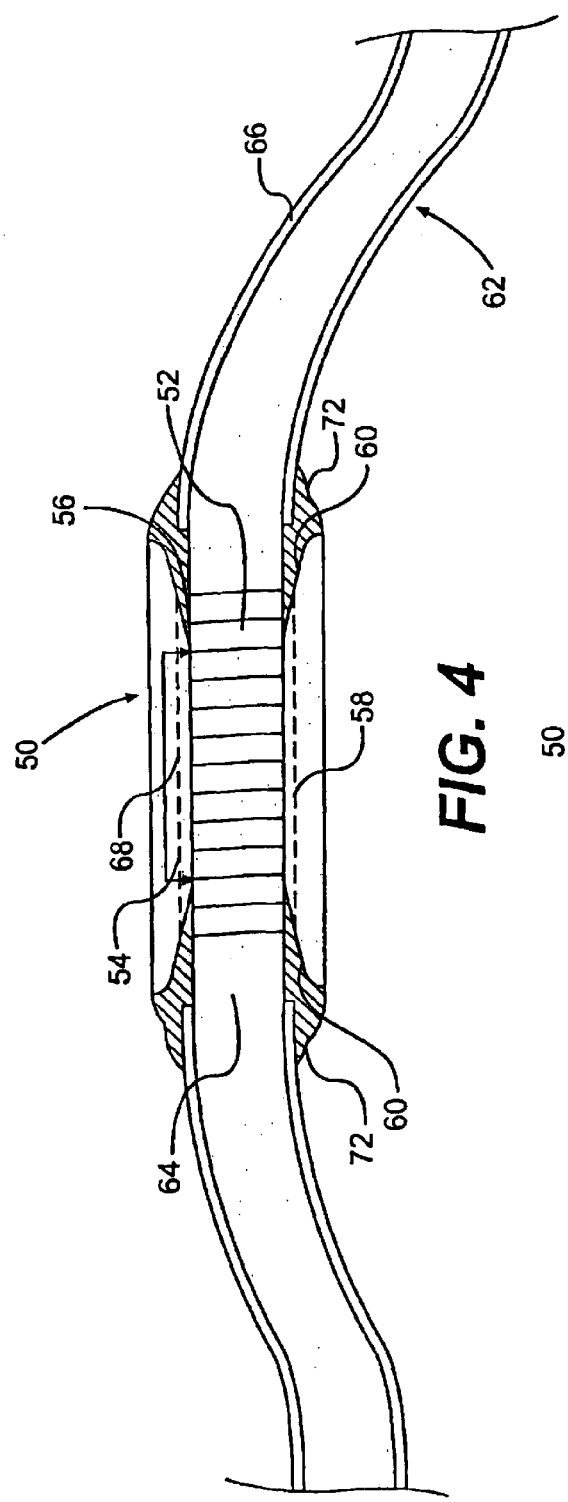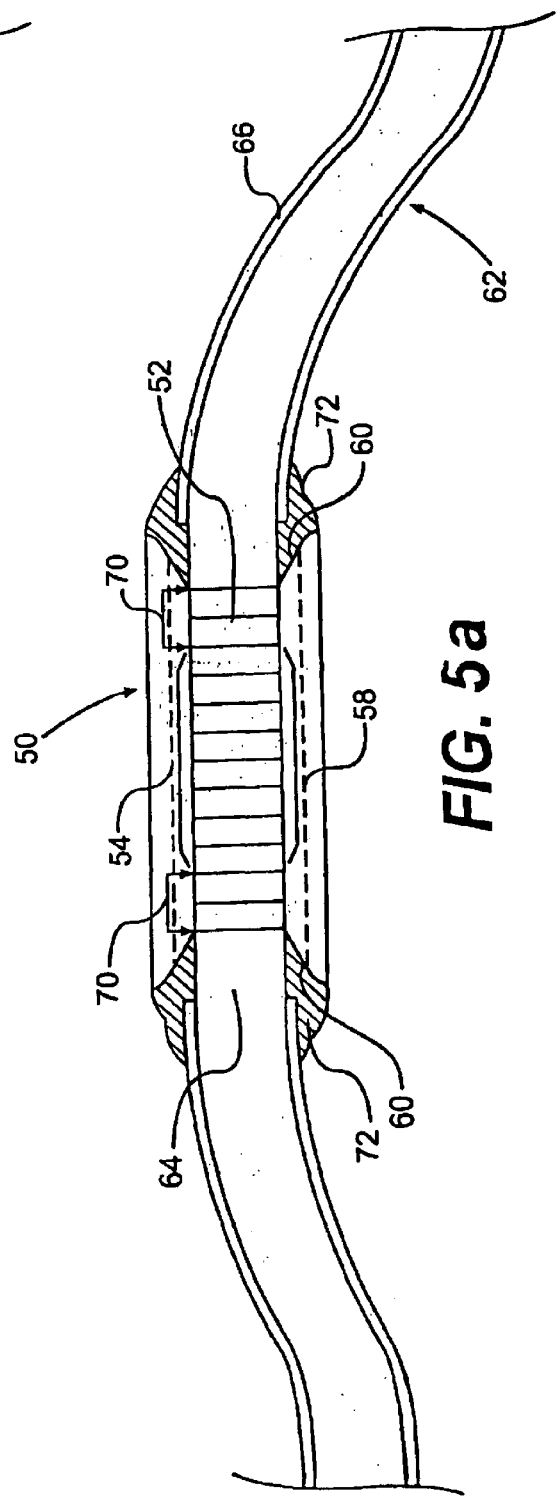

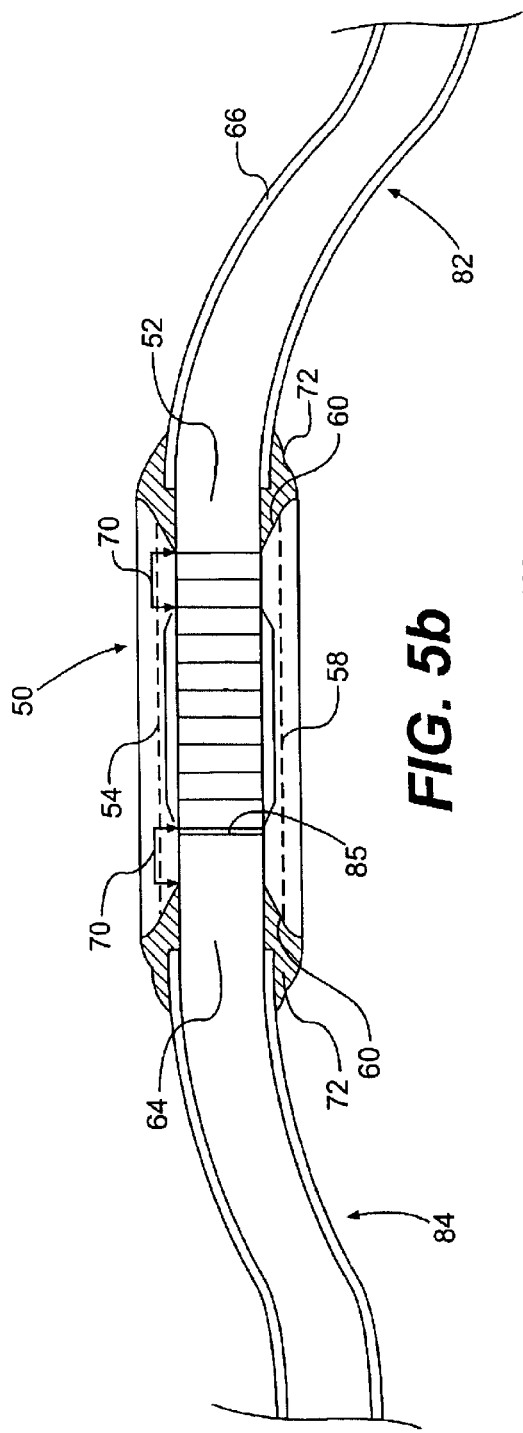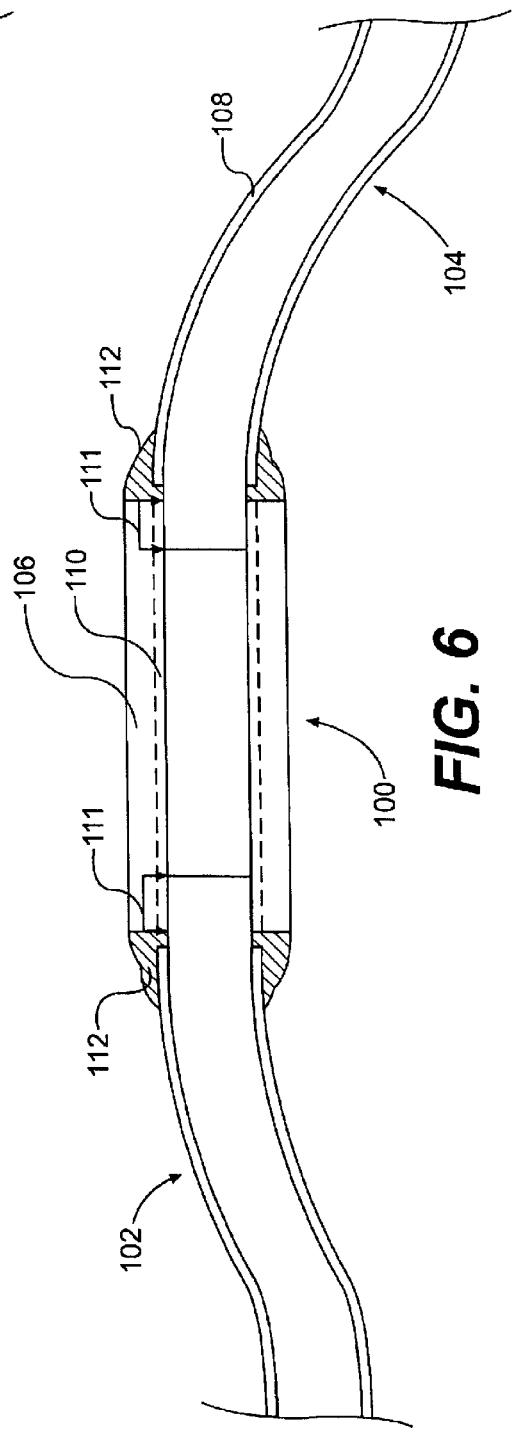
FIG. 5b
FIG. 6

CONNECTOR FERRULE AND METHOD OF SEALING

This application is a continuation-in-part application of U.S. patent application Ser. No. 09/910,863 filed Jul. 24, 2001, which claims priority from U.S. Provisional Patent Application No. 60/267,710, filed Feb. 12, 2001 and entitled "Connector Ferrule and Method of Sealing to an Optical Fiber", herein incorporated by reference.

BACKGROUND OF THE INVENTION

1. Field of the Invention

This invention relates generally to connectors used with optical components. More particularly, it relates to connectors which may be sealed to components by fusing.

2. General Background and Related Art

For joining optical components together, or for incorporation of optical components into other devices, it is often desirable to make use of a ferrule. A ferrule is a piece of glass, ceramic, plastic or metal material having one or more holes into which components such as optical fibers may be inserted. Ferrules offer additional structural strength and support to the fiber as well as facilitating alignment of a fiber with another component.

In addition to optical applications, ferrules may find uses in applications such as joining of capillaries or other components.

In many cases it is desirable to provide a seal to prevent migration of oxygen or other contamination from the environment into a package intended to isolate an active device such as a semiconductor laser or photodetector. In other cases, a fiber must pass through a bulkhead, for example on a mobile platform or in a chemical reactor. A ferrule may also act as a heat sink or power block when a fiber is used in a high power coupling application such as a medical laser delivery system. In other cases, it is important to minimize stress induced by thermal expansion mismatches between the ferrule, bonding adhesive, and inserted optical fiber. The stresses generated by the expansion mismatch can degrade optical and mechanical performance of the overall package. Likewise, ferrules are employed in the construction of modular components which must be conveniently connected and disconnected while maintaining good alignment between fibers and other components.

It has been known in the art to seal fibers to ferrules by several methods including epoxies, metalization of the fiber or by swaging material around the fiber. Some attempts have been made to seal fibers by fusing the fiber together with the ferrule. These have had limited success as the seal generally fails to hold, or the fiber and/or the ferrule fails, particularly when fiber and ferrule are of differing materials. Even if each is made of glass, for example, fusing tends to distort the fiber to such an extent that the fiber's optical characteristics are changed. In the case of single mode or polarization maintaining fibers, the fiber geometry is crucial to its proper operation. Likewise, the small diameter of both core and cladding, and in the case of polarization maintaining fibers, the precise stress distributions, are extremely difficult to maintain during a fusing operation. Moreover, fusing tends to produce stress within the structure of the fiber and the ferrule which may lead to premature failure.

SUMMARY

The present invention provides ferrules and methods for using ferrules which are adapted to be fused to optical fibers and other components.

A ferrule according to an embodiment of the present invention includes an interior wall defining at least one hole, at least a portion of the interior wall comprising a layer preferentially softenable relative to the remainder of the ferrule.

A ferrule according to an embodiment of the present invention includes a ferrule having an interior wall defining at least one hole, at least a portion of the interior wall comprising a layer preferentially softenable relative to the remainder of the ferrule, a capillary tube disposed at least partially within the hole and fused to the ferrule by at least partially softening the layer.

A fiber Bragg grating device according to an embodiment of the present invention includes a ferrule having an interior wall defining at least one hole, at least a portion of the interior wall comprising a layer preferentially softenable relative to the remainder of the ferrule, a fiber including a Bragg grating disposed within at least one hole of the ferrule and fused to the ferrule by at least partially softening the layer.

A method according to an embodiment of the present invention includes fusing an optical fiber into a ferrule having an interior wall defining a hole, at least a portion of the interior wall comprising a layer preferentially softenable relative to the remainder of the ferrule, including disposing a portion of the optical fiber within the hole, heating the layer such that at least a portion softens and flows between the interior wall and the optical fiber, allowing the softened portion to solidify to form a fused region between the ferrule and the optical fiber.

A method of manufacture according to an embodiment of the present invention includes providing a preform including an interior wall defining at least one hole, depositing a material preferentially softenable relative to the preform onto the interior wall, drawing the preform, and cutting the drawn preform to form a plurality of ferrules.

A method of manufacture according to an embodiment of the present invention includes providing a tubular member including an interior wall defining a hole, depositing a material preferentially softenable relative to the tubular member onto the interior wall by chemical vapor deposition, and cutting the tubular member to form a plurality of ferrules.

BRIEF DESCRIPTION OF THE DRAWINGS

FIG. 1b is an end view of the ferrule of FIG. 1a.

FIG. 2 is a cross sectional elevation of a ferrule and fiber according to the present invention, prior to fusing.

FIG. 3 is a cross sectional elevation of the ferrule and fiber of FIG. 2 after fusing.

FIG. 4 is a cross sectional elevation of a fused fiber junction incorporating a Bragg grating according to the present invention.

FIG. 5a is a cross sectional elevation of an alternate fused fiber junction incorporating a Bragg grating according to the present invention.

FIG. 5b is a variation of the fiber junction of FIG. 5a.

FIG. 6 is a cross sectional elevation of a fused flow cell according to the present invention.

FIG. 7 is a cross sectional elevation of another fused flow cell according to the present invention.

DETAILED DESCRIPTION

In the following description, for purposes of explanation and not limitation, specific details are set forth such as particular optical and electrical circuits, circuit components, techniques, etc. in order to facilitate a thorough understanding of the present invention. However, the invention may be practiced in other embodiments that depart from these specific details. Throughout the specification, reference will be made to "a fiber", as will be readily understood by those skilled in the art, the term "a fiber" may be understood to include a single fiber, a fiber bundle, or any other filament-like structure. Moreover, in addition to fusing connections for fibers, the present invention finds uses, for example, in pigtailing of optical devices such as laser diodes, dense wavelength division multiplexing systems, photo detectors, signal modulators, fiber Bragg gratings, isolators, circulators, couplers, switches and attenuators used in optical telecommunications systems as well as in systems such as medical laser power delivery, complex fiber bundles, laser machining and illumination applications.

Figure 1A:
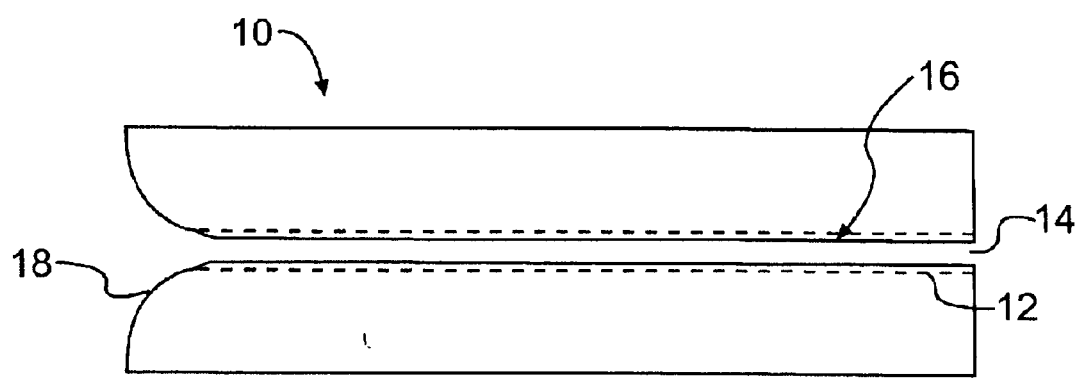
FIG. 1a is a cross sectional elevation of a ferrule according to the present invention.
Figure 1B:
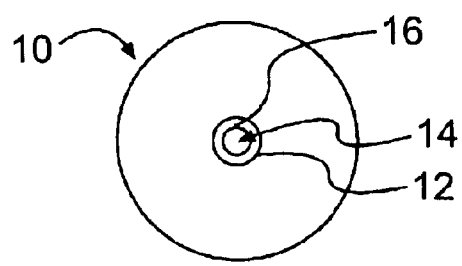
Figure 1:
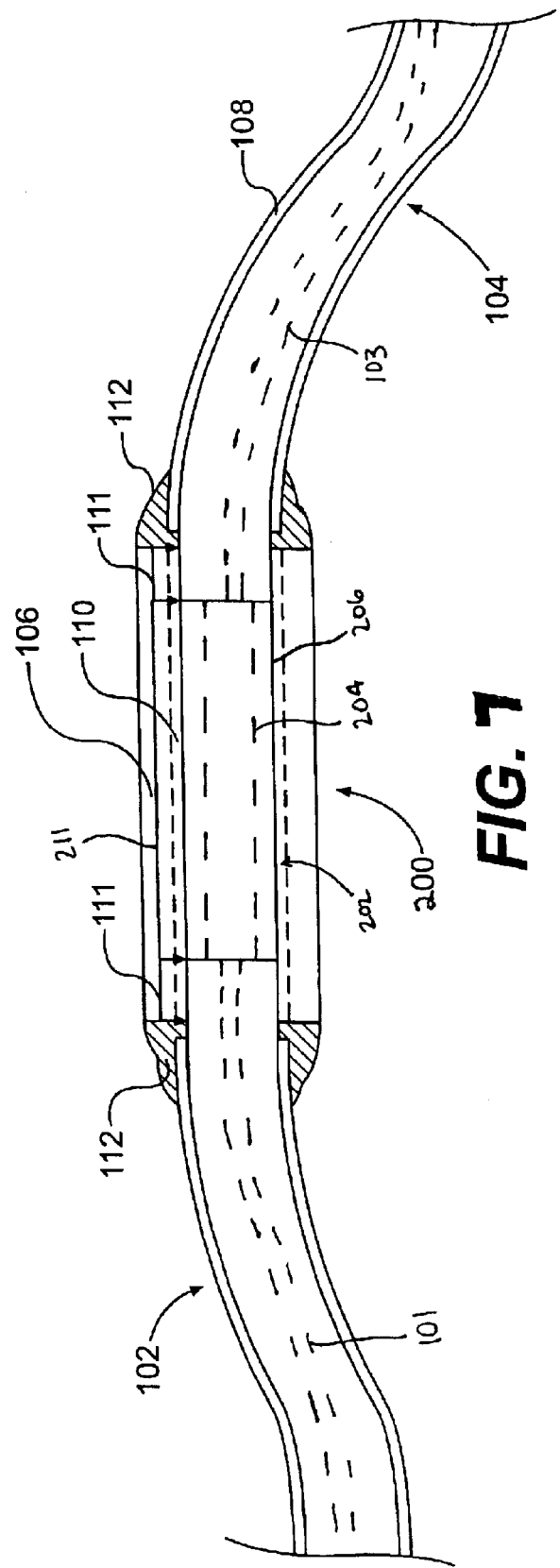

FIG. 1a and FIG. 1b illustrate a ferrule 10 according to the present invention. The ferrule 10 includes an interior wall 12 defining a through hole 14, which extends through the ferrule 10, along its axis. The interior wall 12 includes a thin layer of material 16. The thin layer of material 16 is made of a material which is preferentially softenable relative to the remainder of the ferrule 10. The preferentially softenable layer of material 16 may have a lower softening temperature than the bulk material of the ferrule 10 or, alternately, it may have an increased absorption of a predetermined form of radiation. For example, if the bulk material of the ferrule 10 is a silica based glass, the layer 16 may be a germanium doped layer. The layer 16 may likewise be, for example, a silicon nitride layer or a glass frit material. One skilled in the art will recognize that other materials will be appropriate.

In addition to being preferentially softenable relative to the bulk material of the ferrule 10, the layer 16 may be preferentially softenable relative to the bulk material of a component to be inserted therein.

By way of example, in a glass ferrule 10 having an outer diameter of about 1.8 mm, the inner wall may have a diameter of about 128 $\mu$m and the layer 16 may be a germanium doped layer of about 20 $\mu$m in thickness. The germanium doped layer 16 has a lower softening temperature than does the undoped glass. Likewise, the germanium doped layer 16 has a lower softening temperature than that of a silica fiber, for example, which may be inserted into the ferrule 10 for fusing connection thereto. In general, if the layer 16 has a lower temperature than each of the bulk of the ferrule and the component to be fused to the ferrule, the fusing can take place without substantial deformation of the component or the ferrule.

As may be seen from FIG. 1a, a taper 18 can be included in the ferrule 10 to facilitate insertion of items into the through hole 14.

In FIG. 2, a ferrule 10 similar to that shown in FIGS. 1a and 1b is shown. In addition to the ferrule 10, a fiber 30 is illustrated. The fiber 30 includes a waveguide 32, which in most cases will be made of a silica glass, and a protective buffer 34, which for example, can be acrylate or another plastic material. As may be seen, a portion of the buffer 34 has been removed prior to insertion into the ferrule 10.

FIG. 3 shows the same paired ferrule 10 and fiber 30 after a fusing operation, as described below. After the fusing, a region of fused material 36 is formed. Though there is still a variation in material in a radial direction from the core to the outer edge of the ferrule, the boundaries are not clearly seen in the fused region.

FIGS. 4 and 5 illustrate a ferrule 50 comprising an alternate embodiment of the present invention. In each of these figures, a fiber Bragg grating 52 is attached within the ferrule 50. The ferrule 50 includes an inner wall 54 which defines a through hole 56. A layer of material 58 is formed along the inner wall 54. The layer 58 is made of a material that has a lower softening temperature than does the bulk of the ferrule 50. At each end of the ferrule 50, a taper 60 is formed. While the taper 60 is not required, it facilitates insertion of items into the ferrule. As will be appreciated by one of normal skill in the art, the fiber Bragg grating can be written into the fiber prior to or after insertion into the ferrule.

Through the ferrule 50, a fiber 62, such as a single mode optical fiber is inserted. The fiber 62 includes a waveguide portion 64 and frequently includes a protective buffer 66. The buffer 66 is removed from that portion of the fiber to be inserted into the ferrule 50. In the embodiment shown in FIG. 4, the central region of contact 68 between the ferrule 50 and the Bragg grating 52 has been fused. In FIG. 5, in contrast, the end regions 70 have been fused. In either case, it may be desirable to include as an additional binder, epoxy 72, disposed within the tapers 60, in order to provide additional strain relief.

Though FIGS. 4 and 5 show a fiber Bragg grating 52 which is formed in a region of a single fiber 62, the same ferrule 50 could be used to connect a pair of fibers 82, 84 (see FIG. 5b). For example, in the two fiber arrangement shown in FIG. 5b, the fiber Bragg grating 52 is formed in one end of a first fiber 82 which is fused into the ferrule 50. The second fiber 84 is fused into the ferrule 50 from the other direction, and a face of the second fiber 84 contacts the Bragg grating 52. The embodiment shown in FIG. 5b will tend to suffer from reflections at the grating/fiber interface due to the air gap (shown exaggerated in size), but this problem may be overcome by the insertion of index matching material, or may be ignored if the matching losses are not too high for the application for which the device will be used. Alternatively, the two fibers could be fused.

FIG. 6 illustrates a flow cell 100 according to yet another embodiment of the present invention. In the flow cell 100, a pair of capillary tubes 102, 104 are inserted into the ferrule 106. The capillary tubes 102, 104 may be, for example, glass capillaries having a plastic coating 108, such as a polyimide coating. Each capillary tube 102, 104 has an inner diameter 101, 103, respectively, which can be formed to be varying sizes. As with the previously described ferrules, the ferrule 106 includes a thin layer 110 of material having a relatively lower softening temperature compared with the bulk material of the ferrule 106.

One end of each of the capillaries 102, 104 extends into the ferrule 106 and is fused to the ferrule using the layer of material 110, to form fused regions 111. As with the optical fiber, epoxy 112 may be used to provide strain relief.

FIG. 7 illustrates a flow cell 200 according to yet another embodiment of the present invention. The flow cell 200 has substantially identical structure as the flow cell 100, but further includes at least one additional capillary tube 202 having an inner diameter 204 and an outer diameter 206. The inner diameter 204 may be of varying sizes and may either be of equal size, larger or smaller than the inner diameters 101, 103 of the capillaries 102, 104, respectively. For example, the inner diameter 204 may be of equal size or smaller than one of the inner diameters 101, 103 and may be of equal size or larger than the other of the inner diameters 101, 103. FIG. 7 shows the inner diameter 204 of the at least one additional capillary tube to be larger than the inner diameters 101, 103 of the respective capillaries 102, 104.

In the flow cell 200, the at least one capillary tube 202 may be inserted into the ferrule 106, for example, in a central portion thereof. The at least one additional capillary tube 202 may be, for example, a glass capillary having a plastic coating (not shown), such as a polyimide coating. As with the previously described flowcell and ferrules, the ferrule 106 includes a thin layer 110 of material having a relatively lower softening temperature compared with the bulk material of the ferrule 106.

The at least one additional capillary 202 extends through the ferrule 106 and is at least partially fused to the ferrule using the layer of material 110, to form fused regions 211, such that the inner diameter 204 of the at least one additional capillary 202 is in communication with the inner diameters 101, 103 of the respective capillaries 102, 104. As with the above described ferrule 100, epoxy 112 may be used to provide strain relief.

There are several methods available for producing a ferrule according to the present invention. In one embodiment, a glass tube constituting a preform is coated along an interior wall with a layer of doped glass, glass frit or ceramic material. The coating can be achieved by liquid chemistry, by chemical vapor deposition, or by other deposition processes.

In the case that a doped glass (including a doped silica, fused quartz, or borosilicate glass) is used, the dopants may include, for example, germanium, phosphorous and boron as well as combinations thereof. Dopant concentration may be, for example, less than about 6% dopant by weight and more particularly, less than about 4% dopant by weight. A useful range of dopant is between about 2% and about 4% dopant by weight. In one embodiment, the layer includes between about 2% and about 4% germanium and trace amounts of boron and phosphorous.

The coated preform is then heated and drawn to reduce its cross section to a predetermined size. The drawing process is understood to those skilled in the art and is not discussed in detail herein. The drawn tube can then be cut to an appropriate length, and if a taper is desired, the cut ferrule may be machined.

Alternately, the preform can be prepared without the coating on the interior surface. The preform is then drawn to produce a reduced size tube and the coating is then applied by chemical vapor deposition or other coating process, as described above. Subsequently, the coated tube is cut and, optionally, machined.

In order to seal a fiber 30 into a ferrule 10, as shown in FIG. 2, the fiber 10 is first stripped of any outer coating 34 over an appropriate length (e.g. up to about 2"). The bare end of the fiber 30 is inserted into the ferrule 10. The end of the fiber and the adjoining portion of the ferrule are heated to a temperature high enough for the layer 16 to flow and fill the void between the fiber 30 and the ferrule 10. Once the layer 16 has softened, it will tend to flow under the force of capillary action and/or gravity to fill the entire gap. As the material solidifies, it forms a fused region 36.

In an alternate method, the outer coating 34 is removed in a central region of a fiber 30. The ferrule is then slipped over the exposed glass fiber region and then heated to form the fused region 36. In this case, a single fiber extends out from each end of the ferrule. This method is of particular use with fiber Bragg gratings and the resulting fused ferrule 50 is illustrated in FIG. 4. For example, a Bragg grating so fused to a ferrule tends to be more resistant to strain, which in turn stabilizes the frequency response of the grating. It is also more mechanically robust and thermally stable package. Likewise, the grating could be employed as a strain gauge with a grating attached to a single or pair of ferrules. In the case of a pair of ferrules, each ferrule can be attached to a separate portion of a structure to be measured.

EXAMPLE 1

A preform having a 31 mm outer diameter, a 9.8 mm inner diameter, and a 50 mm length was manufactured from fused quartz. A low softening point layer, approximately 2 mm in thickness was formed on the inner surface of a tube by chemical vapor deposition. The low softening point layer included about 2–4% germanium by weight along with trace amounts of boron and phosphorous doped in fused silica. A second quartz tube was collapsed over the first tube to bring the preform to the proper aspect ratio for drawing. The preform was drawn under elevated temperature to produce an extended tube or "raw ferrule" having an outer diameter of about 1800 $\mu$m and an inner diameter of about 85 $\mu$m. The raw ferrule was cut into sections having a length of about 10 mm, and tapers were machined in one end. A polarization maintaining fiber having an 80 $\mu$m glass outer diameter (e.g. the outer diameter excluding any buffer or coating) was inserted into the ferrule. The fiber and ferrule were rotated, and simultaneously heated with a $CO_2$ laser. The doped glass layer softened and flowed between the fiber and ferrule to produce a fused region.

Ferrules 10 according to the present invention may be made, for example, from metal, glass (including fused quartz, fused silica, borosilicate, etc.), and ceramic. The thin layer 16 may be for example, germanium doped glass, glass frit, or ceramic. One skilled in the art will recognize that the materials described are not exhaustive, and other materials could be used, provided that the material of the layer 16 is selected to soften and flow at a temperature lower than the temperature at which the material of the ferrule 10 or the material of the device to be fused flows. Alternatively, the applied inner layer could be chosen due to its higher absorption of electromagnetic energy at one or more wavelengths. In this case, it is not necessary for the layer to have a lower softening point, but can be preferentially heated such that the layer softens and flows more quickly than the surrounding ferrule material.

While the invention has been described in connection with particular embodiments, it is to be understood that the invention is not limited to the disclosed embodiments, but on the contrary it is intended to cover various modifications and equivalent arrangement included within the spirit and scope of the claims which follow.

What is claimed is:

1. A flowcell device comprising:
    a ferrule having an interior wall defining a hole, at least a portion of the interior wall comprising a layer of material preferentially softenable relative to the remainder of the ferrule; and
    at least one capillary tube extending into the hole and partially fused therein by at least partially softening the layer;
    wherein the ferrule and the layer of material preferentially softenable relative to the remainder of the ferrule are substantially similar materials.

2. A flowcell device as in claim 1, wherein the material preferentially softenable has at least one of: a softening temperature lower than a softening temperature of the remainder of the ferrule, and, an increased absorption of incident radiation relative to the remainder of the ferrule.

3. A flowcell device as in claim 1, further comprising at least one additional capillary tube extending into the hole.

4. A flowcell device as in claim 3, wherein the at least one additional capillary tube has an inner diameter or an outer diameter having an equal or a different size from an inner diameter or an outer diameter of the at least one capillary tube.

5. A flowcell device as in claim 3, wherein the at least one additional capillary tube is partially fused in the hole by at least partially softening the layer.

6. A flowcell device as in claim 1, further comprising at least two additional capillary tubes extending into the hole.

7. A flowcell device as in claim 6, wherein each of the at least two additional capillary tubes have an inner diameter or an outer diameter having an equal or a different size from an inner diameter or an outer diameter of the at least one capillary tube.

8. A flowcell device as in claim 6, wherein each of the at least two additional capillary tubes is partially fused in the hole by at least partially softening the layer.

9. A method of forming a flowcell device, the method comprising:

providing a ferrule having an interior wall defining a hole, at least a portion of the interior wall comprising a layer of material preferentially softenable relative to the remainder of the ferrule; and providing at least one capillary tube extending into the hole; and partially fusing the at least one capillary tube therein by at least partially softening the layer wherein the ferrule and the layer of material preferentially softenable relative to the remainder of the ferrule are substantially similar materials.

10. The method as in claim 9, further comprising extending at least one additional capillary tube into the hole.

11. The method as in claim 10, further comprising partially fusing the at least one additional capillary tube into the hole by at least partially softening the layer.

* * * * *